Dec. 26, 1961  H. KOELMANS ETAL  3,014,878
LUMINESCENT GERMANATES
Filed March 17, 1960
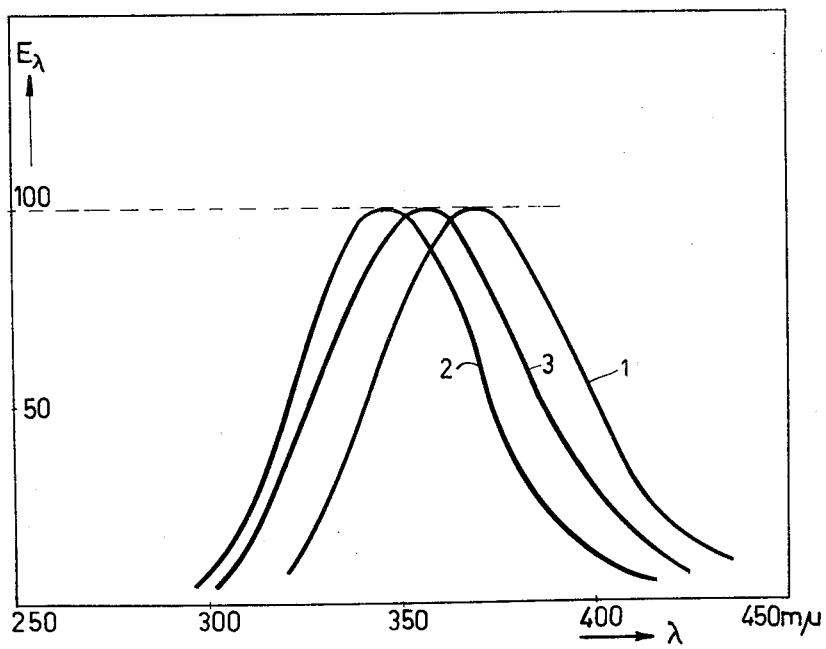
INVENTORS
HEIN KOELMANS
CATHARINA M.C. VERHAGEN
BY
AGENT 3,014,878
Patented Dec. 26, 1961

3,014,878
LUMINESCENT GERMANATES
Hein Koelmans and Catharina Maria Cunera Verhagen, Eindhoven, Netherlands, assignors to North American Philips Company, Inc., New York, N.Y., a corporation of Delaware
Filed Mar. 17, 1960, Ser. No. 15,693
Claims priority, application Netherlands Mar. 20, 1959
5 Claims. (Cl. 252—301.6)

This invention relates to new and novel luminescent substances.

More particularly this invention relates to new and novel luminescent materials having their maximum output efficiencies within the long ultraviolet region.

It is a principal object of this invention to prepare new and novel luminescent substances which exhibit high quantum efficiencies between 300 m$\mu$ and 400 m$\mu$.

According to the invention new and novel luminescent germanates are prepared. These new and novel germanates satisfy the formula $2MO.1QO.2GeO_2:XPb$ wherein M represents at least one element selected from the group consisting of barium and strontium, Q represents at least one element selected from the group consisting of zinc and magnesium and $x$ has a value between $10^{-3}$ and $10^{-1}$.

The germanates of the invention have a conversion efficiency that is substantially equal to that of the corresponding silicates. However, upon excitation with radiation of 253.7 m$\mu$ the germanates exhibit maximum emissions at longer wavelengths more particularly between 325 m$\mu$ and 385 m$\mu$. Because the maximum emissions occur in this range the germanates of the invention are particularly suitable for use as the ultraviolet source in radiation sources used in blueprinting and in causing advertising signs coated with luminescent paint to light up.

The compounds in accordance with the present invention containing only barium have an emission maximum at a slightly longer wavelength than the corresponding compounds containing only strontium. For mixed compounds, the emission maximum lies between. The proportion of lead in the range of the invention only slightly influences the position of the emission maximum. However, outside the above-mentioned range of the lead concentration, the intensity of the emission is too small for practical use. The elements zinc and magnesium are equivalent with respect to the position of the emission maximum.

The invention will now be described more fully with reference to a number of examples of preparing various germanates in accordance with the invention and the accompanying drawing. The sole figure in the drawing is a graph in which the wavelengths in m$\mu$ are plotted as abscissae and the relative intensities of the emitted radiation are plotted as the ordinates. For each curve, the maximum has been converted to 100 in order to allow a satisfactory comparison of the positions and shapes of the emission curves. All the curves are made with excitation by a radiation having a wavelength of 253.7 m$\mu$.

In the examples that follow the initial composition of the mixture always is such that it is substantially precluded that the final product still contains any germanium dioxide since the germanium dioxide exhibits a large ultraviolet absorption.

Example 1

77 g. of $BaCO_3$
8 g. of MgO
0.7 g. of $MgF_2$
42 g. of $GeO_2$ are thoroughly mixed. 40 ml. of a 0.1 N-solution of $Pb(NO_3)_2$ are added to the mixture. After drying the paste, the substance is heated in air to 1100° C. for 2 hours. The fired product shows an intense ultraviolet emission on excitation by a radiation source having a wavelength of 253.7 m$\mu$. The emission curve is designated 1 in the drawing. The quantum efficiency of the resultant luminescent substance is approximately 80%.

Example 2

57 g. of $SrCO_3$
15 g. of ZnO
1 g. of $ZnF_2$
42 g. of $GeO_2$ are thoroughly mixed. 100 ml. of a 0.1 N-solution of $Pb(NO_3)_2$ are added to the mixture. After drying the paste, the substance is heated in air to 1050° C. for 2 hours. After cooling the product is ground and then again heated in air to 1100° C. for 2 hours. The final product shows a comparatively intense ultraviolet emission on excitation by a radiation source having a wavelength of 253.7 m$\mu$. The emission curve is designated 2 in the drawing. The quantum efficiency of the resultant product is approximately 40%.

Example 3

39 g. of $BaCO_3$
29 g. of $SrCO_3$
8 g. of MgO
0.7 g. of $MgF_2$
42 g. of $GeO_2$ are thoroughly mixed. 10 ml. of a 0.1 N-solution of $Pb(NO_3)_2$ are added to the mixture. After drying the moist mixture, it is heated in air to a temperature of 1100° C for 1 hour. After cooling, the fired product is ground and then again fired at 1150° C. for 2 hours. The final product shows an intense ultraviolet emission on excitation by a radiation source having a wavelength of 253.7 m$\mu$. The emission curve is designated 3 in the drawing. The quantum efficiency of the resultant product is approximately 80%.

Example 4

59 g. of $SrCO_3$
7 g. of ZnO
1 g. of $ZnF_2$
4 g. of MgO
42 g. of $GeO_2$ are thoroughly mixed. 200 ml. of 0.1 N-solution of $Pb(NO_3)_2$ are added to this mixture. After drying, the mixture is heated in air to a temperature of 1050° C. for 1 hour. After cooling, the fired product is ground and then again heated to a temperature of 1150° C. in air for 2 hours. The final product shows an intense ultraviolet emission on excitation by a radiation source having a wavelength of 253.7 m$\mu$. The emission curve of the product substantially coincides with the curve 3 of the drawing. The quantum efficiency of the obtained product is approximately 45%.

In the above examples, the fluorides of magnesium or zinc are used as fluxes. This results in an improved crystallization state of the final products, which state can be obtained at a lower temperature than without a flux. Obviously, the amount of zinc or magnesium introduced by the flux into the final product is allowed for.

While we have described our invention in connection with specific embodiments and applications, other modifications thereof will be readily apparent to those skilled in this art without departing from the spirit and scope of the invention as defined in the appended claims.

What is claimed is:

1. Luminescent materials corresponding to the general formula:

$$2MO.1QO.2GeO_2:XPb$$

wherein M represents at least one element selected from the group consisting of barium and strontium, Q represents at least one element selected from the group consisting of zinc and magnesium and X has a value between $10^{-3}$ and $10^{-1}$.

2. Luminescent materials corresponding to the general formula:

$$2BaO.1QO.2GeO_2:XPb$$

wherein Q represents at least one element selected from the group consisting of zinc and magnesium and X has a value between $10^{-3}$ and $10^{-1}$.

3. Luminescent materials corresponding to the general formula:

$$2SrO.1QO.2GeO_2:XPb$$

wherein Q represents at least one element selected from the group consisting of zinc and magnesium and X has a value between $10^{-3}$ and $10^{-1}$.

4. Luminescent materials corresponding to the general formula:

$$2MO.1ZnO.2GeO_2:XPb$$

wherein M represents at least one element selected from the group consisting of barium and strontium, and X has a value between $10^{-3}$ and $10^{-1}$.

5. Luminescent materials corresponding to the general formula:

$$2MO.1MgO.2GeO_2:XPb$$

wherein M represents at least one element selected from the group consisting of barium and strontium, and X has a value between $10^{-3}$ and $10^{-1}$.

References Cited in the file of this patent

UNITED STATES PATENTS 2,457,054    Leverenz _____ Dec. 21, 1948

OTHER REFERENCES

Koelmans et al.: The Fluorescence of Binary and Ternary Germanates of Group II Elements, Journal of the Electrochemical Society, August 1959, pages 677–681.